United States Patent
Ritt et al.

[19]

[11] Patent Number: 6,106,070
[45] Date of Patent: Aug. 22, 2000

[54] HEIGHT-ADJUSTABLE CHAIR ARM ASSEMBLY

[75] Inventors: Robert T. Ritt, Holland Township, Ottawa County; Steve J. Nemeth, Jr., Park Township, Ottawa County; Richard N. Roslund, Jr., Georgetown Township, Ottawa County, all of Mich.

[73] Assignee: Haworth, Inc., Holland, Mich.

[21] Appl. No.: 09/191,615

[22] Filed: Nov. 13, 1998

Related U.S. Application Data

[62] Division of application No. 08/857,032, May 15, 1997, Pat. No. 5,853,223, which is a division of application No. 08/486,613, Jun. 7, 1995, Pat. No. 5,647,638.

[51] Int. Cl.[7] ..................................................... A47C 7/54
[52] U.S. Cl. ................ 297/411.35; 403/361; 297/411.31
[58] Field of Search .......................... 297/411.35, 411.36, 297/411.38, 411.31; 403/361, 372, 383

[56] References Cited

U.S. PATENT DOCUMENTS

| | | | |
|---|---|---|---|
| 3,038,194 | 6/1962 | Arenson | 403/372 X |
| 3,515,417 | 6/1970 | Bowman | 403/372 X |
| 4,636,106 | 1/1987 | Waisbrod | 403/372 X |
| 5,393,124 | 2/1995 | Neil | 297/411.35 |
| 5,407,249 | 4/1995 | Bonutti | 297/411.35 |
| 5,439,267 | 8/1995 | Peterson et al. | 297/411.36 |

*Primary Examiner*—Peter R. Brown
*Attorney, Agent, or Firm*—Flynn, Thiel, Boutell & Tanis, P.C.

[57] ABSTRACT

A chair having height-adjustable arm assemblies mounted adjacent opposite sides of the seat. Each arm assembly includes a horizontally elongated armrest which adjacent one end is connected to an upper end of a support column. The support column is axially slidably supported within an elongate support tube which projects downwardly adjacent a side of the chair seat. The support column and support tube have a cooperating linear anti-friction bearing arrangement therebetween, the latter incorporating a resilient support track to eliminate circumferential clearance. A latch mechanism includes a movable latch member carried on the column and cooperating with a plurality of latch-receiving slots formed in the support tube. The latch member is activated by a push rod which projects upwardly through the support column, and at its upper end is activated by an actuating lever which is pivoted on and projects lengthwise of the armrest and terminates in an actuating button disposed under the front end of the armrest.

20 Claims, 10 Drawing Sheets

HEIGHT-ADJUSTABLE CHAIR ARM ASSEMBLY

This is a division of Ser. No. 08/857,032 filed May 15, 1997, now U.S. Pat. No. 5,853,223 which is a division of Ser. No. 08/486,613, filed Jun. 7, 1995, now U.S. Pat. No. 5,647,638.

FIELD OF THE INVENTION

This invention relates to chairs with adjustable arms and, more particularly, to an armrest which can be conveniently vertically adjusted with respect to the chair seat, and which preferably can also be horizontally swiveled relative to the chair seat.

BACKGROUND OF THE INVENTION

Chairs designed for use particularly in office environments and the like are being increasingly provided with adjustment features and contours so as to improve the ergonomics of the chair, particularly in those situations where the chair is used for long periods of time, such as when an occupant is working at a computer terminal, to provide improved comfort and healthful support of the occupant's body. One of the areas which has been addressed to improve such comfort relates to the chair arms, and same known chairs have provided arms having position adjustability, particularly with respect to the ability to vary the armrest height relative to the seat. The known chairs which possess height-adjustable chair arms typically employ vertically telescopic supports and a cooperating releasable latch arrangement for permitting height adjustment. Most known arrangements, however, have possessed disadvantages, either from a manufacturing or structural viewpoint, or from an operational viewpoint. For example, many of the structures are undesirably complex, and/or possess undesired play or looseness in the telescopic mechanism which interferes with efficient height adjustment and also detracts from the desired stability of the chair arm, and/or the overall support arrangement and cooperating latch mechanism is such as to make release of the latch and adjustment of arm height difficult or inconvenient, particularly to an occupant seated in the chair.

Accordingly, it is an object of this invention to provide a chair having a height-adjustable arm assembly associated therewith, which arm assembly significantly improves upon and overcomes many of the disadvantages as briefly summarized above.

More specifically, the improved height-adjustable chair arm assembly of this invention effectively eliminates play or clearance between the vertically telescoping members of the assembly so that height adjustment can be carried out easily and efficiently with minimal user force or effort, and at the same time the effective elimination of play or clearance provides a smooth and efficient height adjustment and also provides the chair arm, both during height adjustment and when locked in the selected position, with a secure and stable feel.

The height-adjustable arm assembly of this invention also provides an improved latching mechanism which extends through the armrest and the telescopic support column so as to permit easy and efficient unlatching and height adjustment is desired, with the occupant in a seated position being able to easily release and maintain the latching mechanism in an unlatched position while at the same time permitting the occupant to easily raise or lower the arm while seated, and then permit the latch to re-engage.

The height-adjustable arm assembly of this invention in addition preferably incorporates a swivel support cooperating between the armrest and the height-adjusting support column so that the armrest itself can be substantially horizontally swiveled and maintained in a plurality of different positions, including positions angled inwardly or outwardly or projecting forwardly or rearwardly, to increase the flexibility and comfort of use of the chair, depending upon the type of task being performed by the occupant.

Briefly, the present invention comprises a chair, such as an office-type chair, having a pair of height-adjustable arm assemblies mounted on the chair adjacent opposite sides of the seat and projecting upwardly therefrom. Each arm assembly includes a generally horizontally elongated armrest which adjacent one end is connected to an upper end of an upwardly projecting support column. The support column projects downwardly and is axially slidably supported within an elongate support tube which projects downwardly adjacent an exterior side of the chair seat. The support tube has bracket structure fixed thereto which projects downwardly and inwardly for fixed securement to the internal frame structure or chair control as associated with the underside of the seat. The support column and support tube have a cooperating linear anti-friction bearing arrangement cooperating therebetween, the latter incorporating a resilient support track mounted on the center column and cooperating with rolling bearing members so as to permit free rolling thereof during height adjustment of the column while at the same time effectively eliminating any circumferential clearance or play between the column and the support tube. A latch mechanism is also associated with the assembly and includes a movable latch member which is carried on the column and cooperates with a plurality of latch-receiving slots formed in the support tube. The latch member is activated by a push rod which movably projects upwardly through the support column, which push rod at its upper end is activated by an actuating lever which is pivoted on and projects lengthwise of the armrest and terminates in an actuating button disposed under the front end of the armrest. The connection between the rear of the armrest and the upper end of the support column, in a preferred embodiment, defines a swivel bearing having a generally vertical swivel axis, together with a cooperating rotary detent array structure, so as to enable the armrest to be horizontally swiveled relative to the support column into a plurality of different use positions.

Other objects and purposes of the invention will be apparent to persons familiar with structures of this general type upon reading the following specification and inspecting the accompanying drawings.

Certain terminology will be used in the following description for convenience in reference only, and will not be limiting. For example, the words "upwardly", "downwardly", "rightwardly" and "leftwardly" will refer to directions in the drawings to which reference is made. It will be understood that the words "upwardly" and "downwardly" will also refer to the directions of height adjustment of the armrest relative to the chair seat, these being the actual physical directions experienced by the chair occupant during height adjustment. The words "inwardly" and "outwardly" will respectively refer to directions toward and away from the center of the chair, the center of the arm assembly, or designated parts thereof. Said terminology will include the words specifically mentioned, derivatives thereof, and words of similar import.

DETAILED DESCRIPTION

Figure 1:
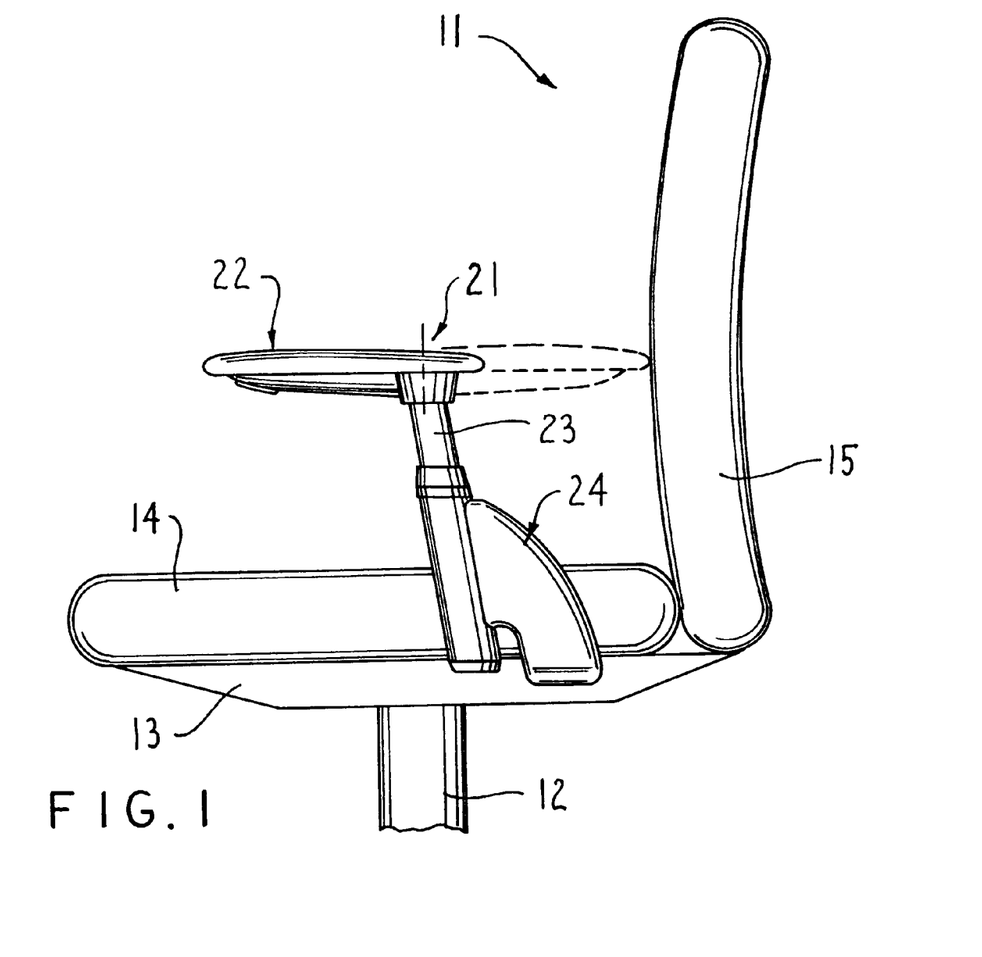
FIG. 1 is a fragmentary side elevational view of a chair having the improved height-adjustable chair arm assembly of this invention mounted thereon, this view showing the left-side chair arm assembly.
Figure 2:
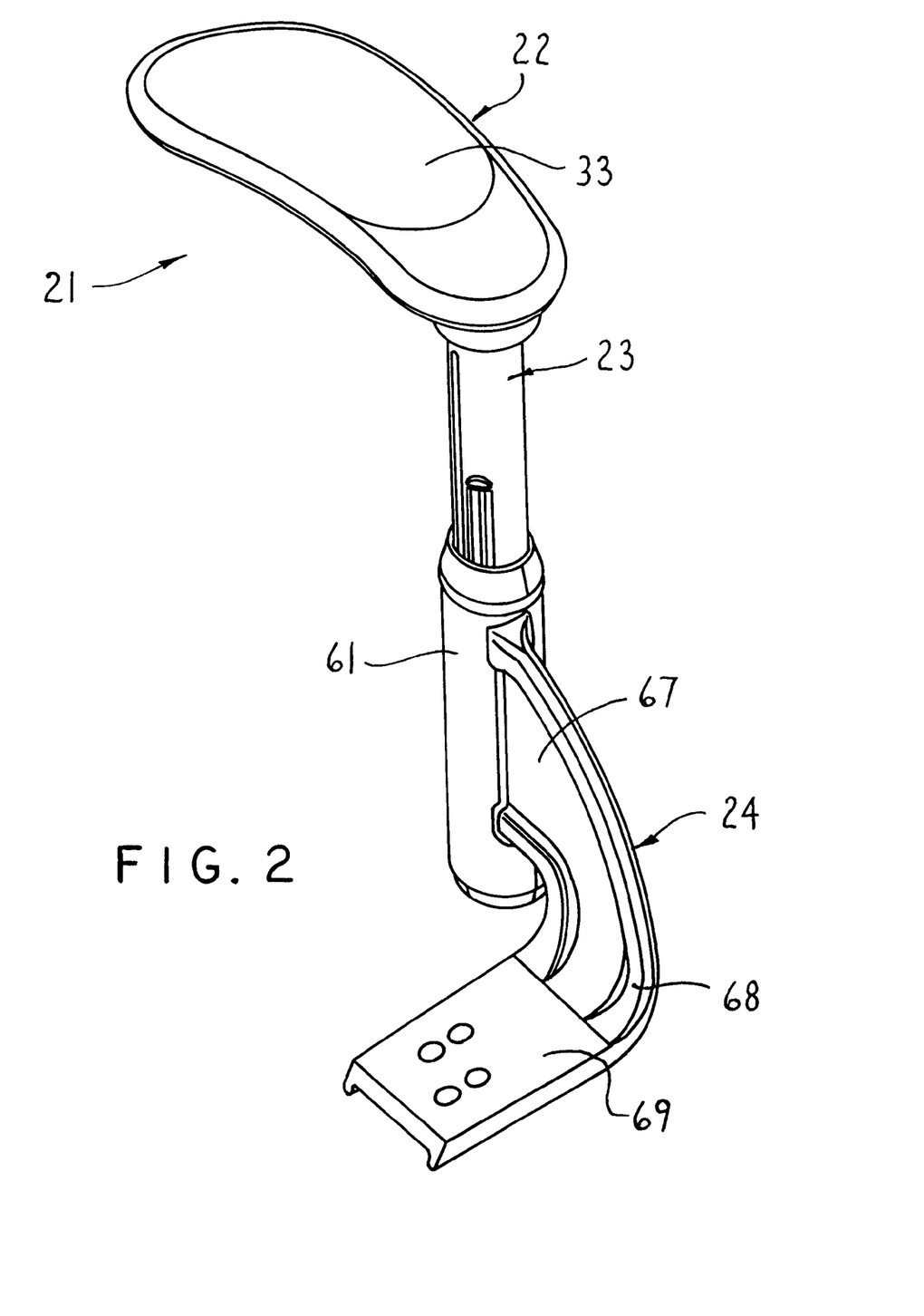
FIG. 2 is a perspective view of a right-side height-adjustable chair arm assembly according to the present invention, the assembly being shown removed from the chair for clarity of illustration.

FIG. 1 diagrammatically illustrates a chair 11, often referred to as an office-type chair. This chair employs a center pedestal 12 which projects upwardly from a base (not shown) and mounts on the upper end thereof a suitable chair control or seat frame 13, the latter mounting thereon the chair seat 14. A chair back 15 projects upwardly from adjacent the rear edge of the seat 14.

According to the present invention, the chair 11 is provided with a pair of height-adjustable arm assemblies 21 mounted thereon, namely right and left assemblies which are respectively disposed adjacent the right and left sides of the seat 14 so as to project upwardly therefrom to hence permit the chair occupant to be seated therebetween. The right and left chair arm assemblies 21 are substantially identical except for being mirror images of one another, and only the left-side assembly is visible in FIG. 1.

According to the present invention, and as illustrated by FIGS. 1–5, the height-adjustable chair arm assembly 21 includes an armrest 22 which is elongated generally horizontally so as to be positionable at an elevation significantly above the seat 14 adjacent one side edge thereof. This armrest 22, adjacent one end thereof, connects to an upper end of an upwardly projecting support column 23, the latter having its lower end stationarily but optionally slidably supported within an arm attachment bracket 24. This latter bracket is positioned exteriorly adjacent one side of the seat 14 and projects downwardly and thence inwardly for fixed attachment to the chair control or seat frame 13 in a generally conventional manner.

The armrest 22, as illustrated by FIGS. 4–7, includes a base member 31 which defines thereon a generally horizontally enlarged top surface 32 to which is fixedly secured an arm cap 33, the latter having a suitably contoured exterior upper surface so as to permit comfortable contact with the occupant's arm and elbow. This arm cap 33 will, in one embodiment, be molded of a reasonably hard elastomeric material having limited resiliency, although it will be appreciated that numerous other materials including fabric-covered arm caps can be provided if desired. The base member 31 also has a channel-like rib 34 projecting downwardly, which rib extend longitudinally (i.e. lengthwise) of the base member and defines a lengthwise-extending channel 35 therein. The rib 34 at its rearward end merge into an enlarged support hub 36 which is formed integral with the base member and projects downwardly from the top surface 32. This support hub 36 defines therethrough a generally cylindrical bore 37, the axis 38 of which extends substantially vertically and functions as a swivel axis for the armrest, as explained below.

Figures 6, 12, 13, 14:
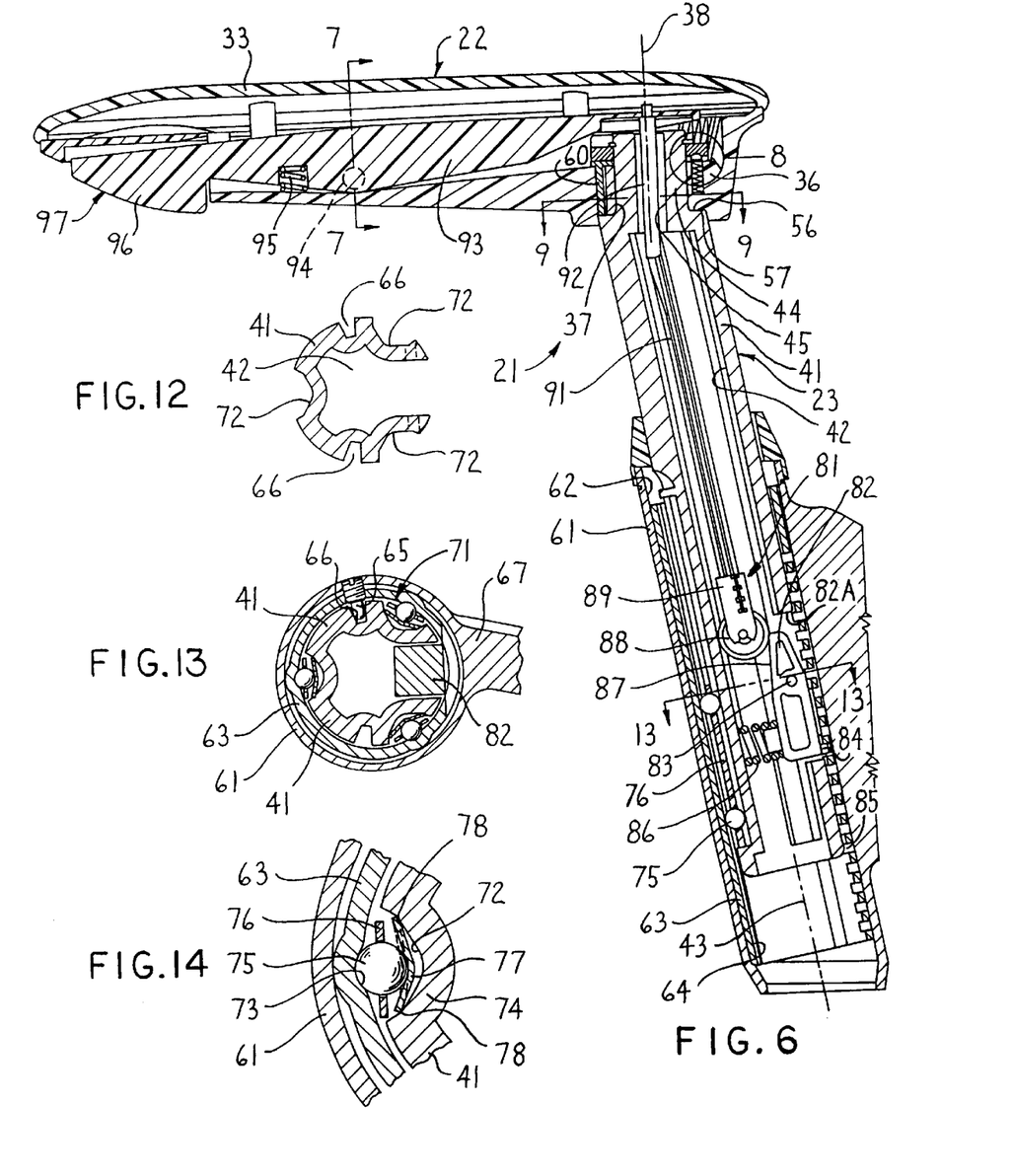
FIG. 6 is a side elevational view of the assembly similar to FIG. 5 but taken generally in central cross section.
FIG. 12 is a sectional view taken generally along line 12—12 in FIG. 10.
FIG. 13 is a sectional view taken generally along line 13—13 in FIG. 6.
FIG. 14 is an enlarged, fragmentary sectional view of a portion of FIG. 13 and specifically illustrating the resilient linear bearing arrangement.
Figure 7:
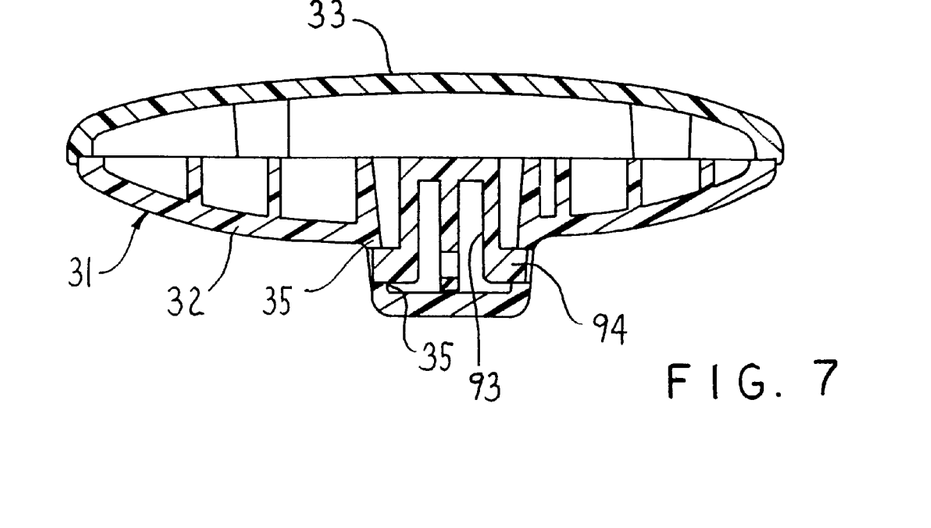
FIG. 7 is a sectional view taken generally along line 7—7 in FIG. 6.
Figure 8:
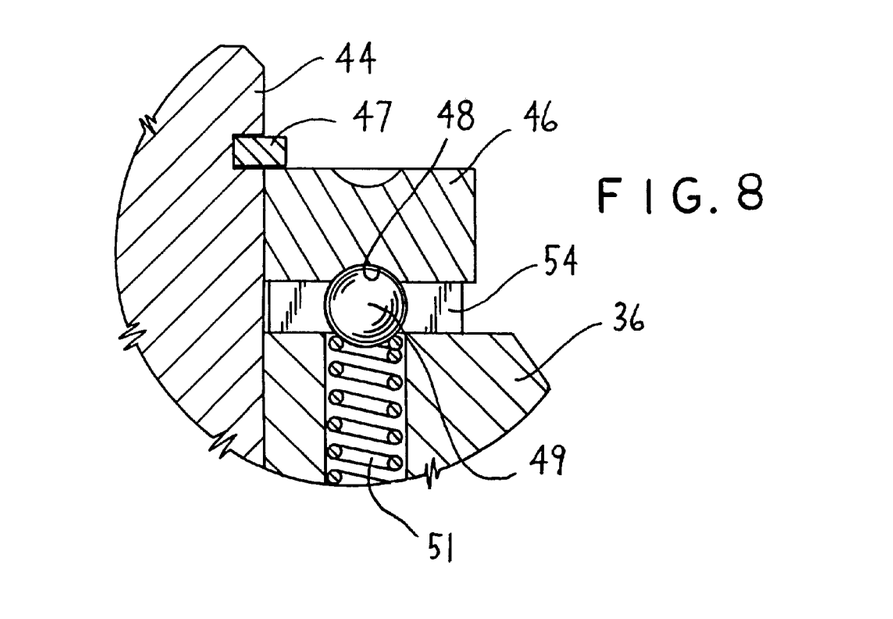
FIG. 8 is an enlarged, fragmentary sectional view of the region enclosed within the circle designated "8" in FIG. 6.

The support column 23, as shown in FIG. 6, comprises a generally vertically elongate column member 41 which is generally cylindrical in cross section and has a central opening 42 extending longitudinally thereof. The column member 41 is disposed so that its longitudinal axis 43, while it projects dominantly vertically, is also slightly inclined in a forward direction relative to the chair seat. The elongate column member 41, at its upper end, has an upwardly projecting cylindrical hub 44 of reduced diameter, which hub has its axis projecting vertically generally along a reduced-diameter opening 45 which also projects axially through the cylindrical hub. This hub 44 projects into and is snugly but relatively rotatably seated within the cylindrical bore 37 defined by the support hub 36 of the armrest, as explained in greater detail below. An upwardly facing shoulder 56 on the support column abuts against an opposed downwardly facing shoulder 57 defined on the support hub 36.

The armrest 22 and column 23 are attached together by a washer or plate 46 which is nonrotatably keyed to the cylindrical hub 44 and is also axially restrained relative thereto by a snap ring 47. This washer 46 on the bottom surface thereof is provided with a plurality of circumferentially spaced detent recesses, one being shown at 48. This detent recess 48 receives therein a detent ball 49 which is urged upwardly by a spring 51 which is confined within a bore or pocket 52 formed in the support hub 36. The ball 49 is circumferentially constrained within a slot or opening 53 formed in a further washer 54, the latter being nonrotatably secured and supported on the hub 36 in surrounding relationship to the cylindrical hub 44, with the upper surface of the washer 54 being maintained in relatively rotatable and supportive bearing engagement with the bottom surface of the washer 46.

Figure 9:
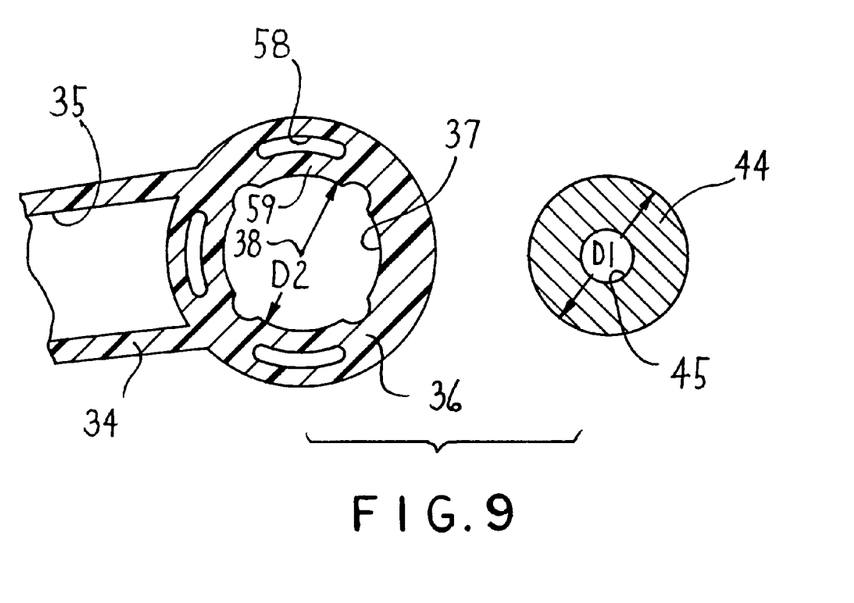
FIG. 9 is a fragmentary, exploded, sectional view taken generally along line 9—9 in FIG. 6.
Figure 10:
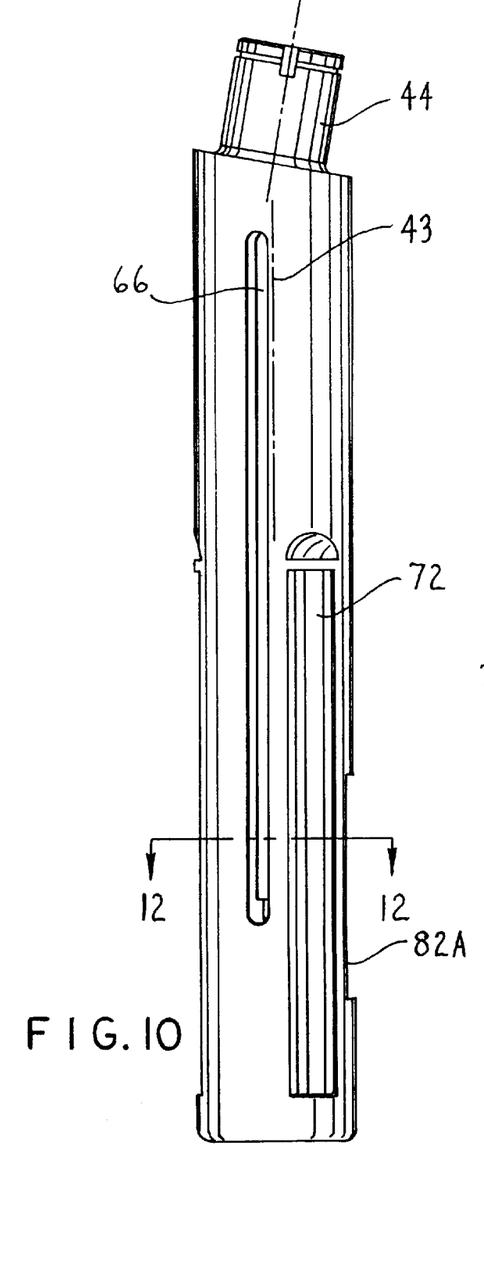
FIGS. 10 and 11 hare respectively side and rear elevational views of the support column which connects the armrest structure to the arm attachment bracket.
Figure 11:
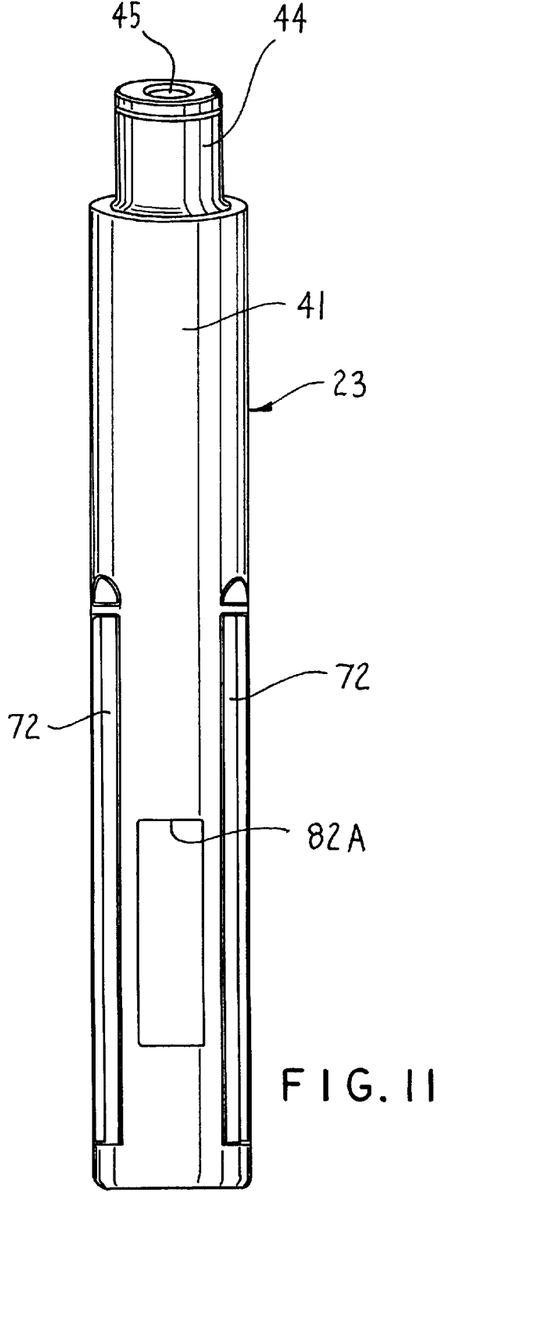

As illustrated by FIG. 9, the opening 37 as formed in the hub 36 of the base 31 initially has a diameter D2 which is slightly smaller than the exterior diameter D1 of the cylindrical hub 44 formed on the support column 41. However, the annular wall of the hub 36 has a plurality of slots 58 formed axially thereof, which slots 58 are in circumferentially spaced relationship and are circumferentially elongated. These slots are spaced radially outwardly from the inner wall which defines the bore 37, whereby the hub defines a plurality of circumferentially elongate resilient bands or webs 59 which are disposed in circumferentially spaced relationship around a significant extent of the bore 37. Since the hub 36 and in fact the entire arm cap base 31 is preferably formed (as by being molded) of a plastics material, these bands or webs 59 allow a small amount of resilient radial deformation or deflection. Accordingly, when the oversized hub 44 is inserted into the bore 37, the webs 59 resiliently deflect radially outwardly to accommodate the hub 44 and thereby create a snug fit between the hubs 36 and 44. There is thus effectively created a tolerance absorbing (i.e., a zero tolerance) joint between these two hubs. However, since the base 31 is of a rather hard plastic material having reasonably high lubricity or similar bearing-like properties, the arm cap base 31 can still readily swivel about the support hub 44 as indicated by the positional relationships illustrated by FIG. 3.

The washer 54 has a plurality of spike-like legs 60 projecting downwardly from the underside thereof, one such leg 60 projecting into each of the slots 58. The insertion of these legs 60 into the slots 58 performs two functions, the first being to non-rotatably secure the washer 54 with respect to the hub 36, the second being to minimize the radial clearance defined by the slots 58 to hence limit the extent of outward radial deflection of the webs 59. In this respect, sufficient radial clearance is provided to readily enable the hub 44 to be inserted into the bore 37. However, when in this assembled condition, the legs 60 otherwise substantially fully occupy the radial width of the slots 58 to thus prevent any additional significant radial deflection, thereby effectively providing a solid structure which can structurally withstand the downward loads imposed on the armrest.

Figure 3:
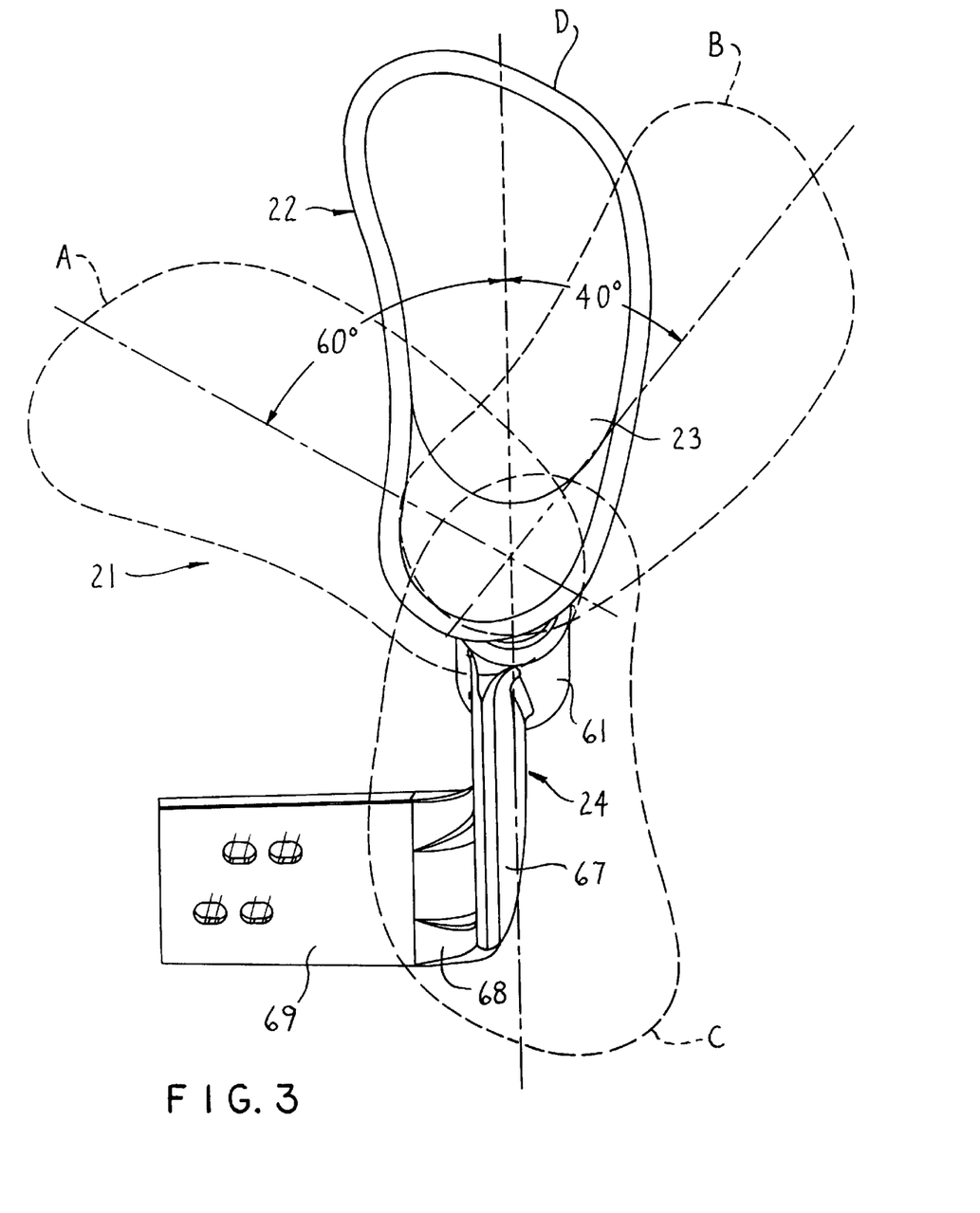
FIG. 3 is a top view of the assembly shown in FIG. 2, with alternative positions of the armrest being shown by dotted lines.
Figure 4:
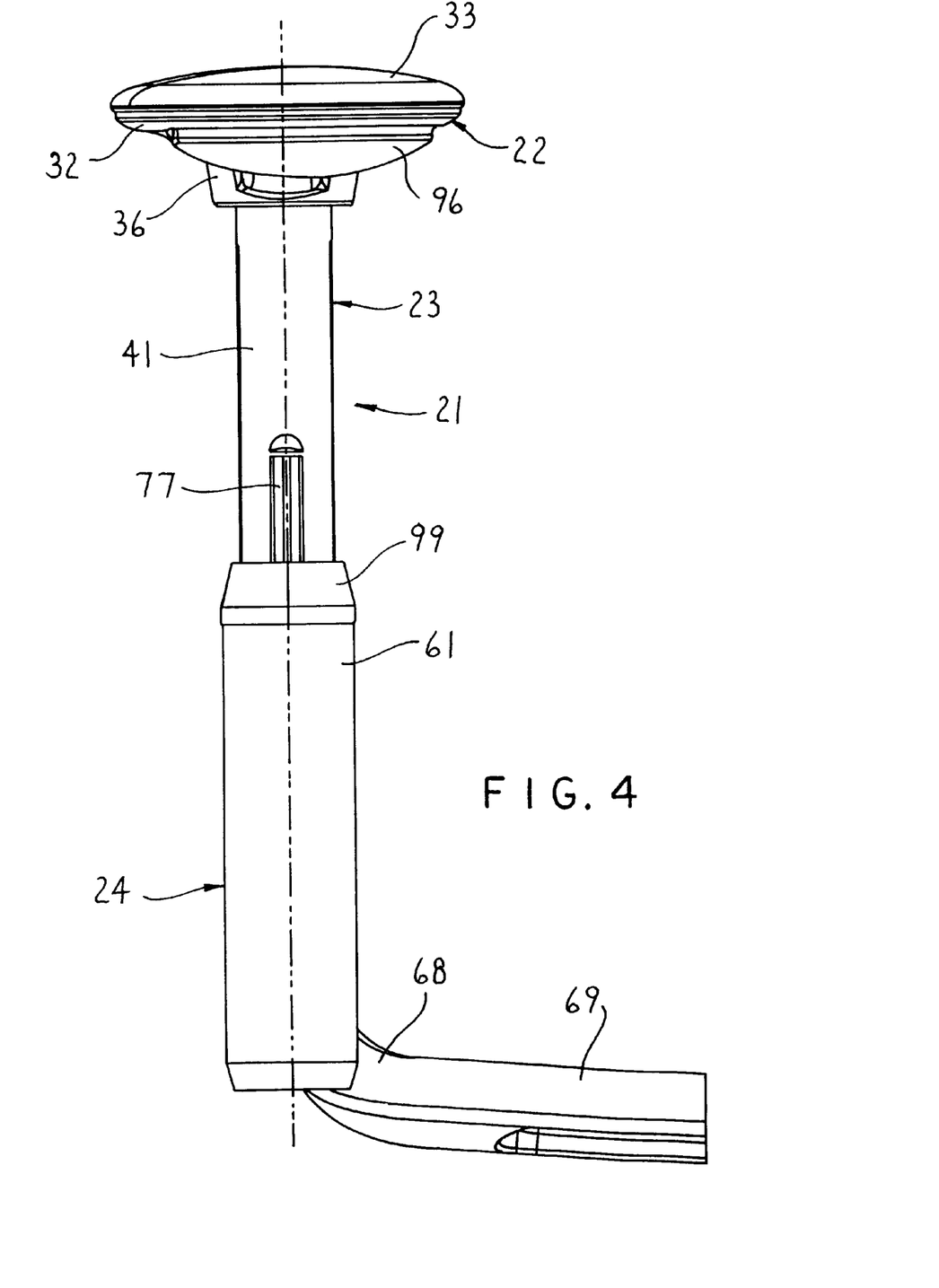
FIG. 4 is a front elevational view of the assembly of FIGS. 2 and 3.
Figure 5:
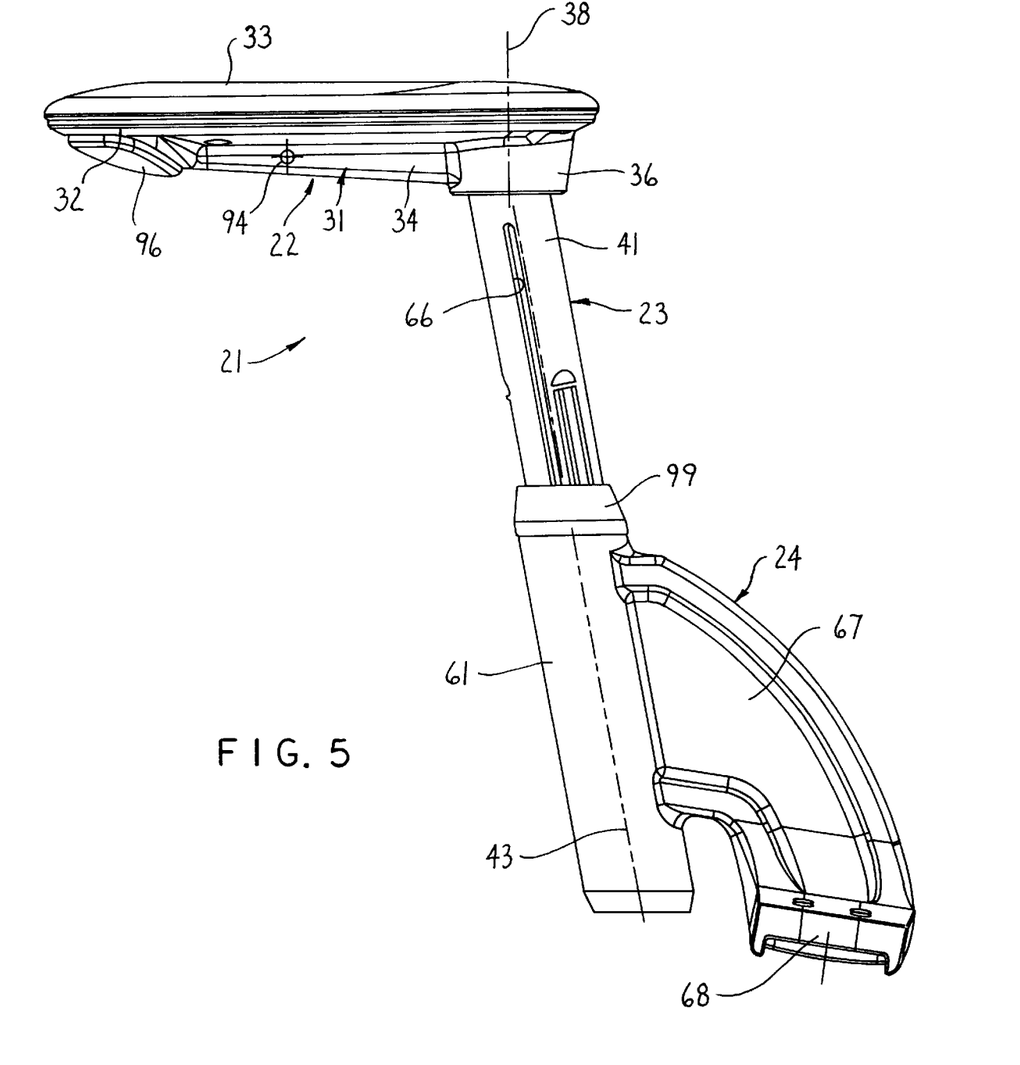
FIG. 5 is a side elevational view of the assembly taken from the inner side thereof, namely the left side in FIG. 3.

In the illustrated embodiment, the washer 46 preferably has four detent recesses 48 disposed in angularly spaced relationship around the bottom surface thereof, which four recesses are disposed so as to permit the armrest 22 to horizontally swivel about the axis 38 and then be resiliently detented for securement into not only the forwardly extending position designated D as illustrated by solid lines in FIG. 3, but also into inwardly and outwardly angled positions shown by dotted lines and respectively designated at A and B in FIG. 3, as well as a reversely oriented or rearwardly extending position for the armrest, such as also indicated by dotted lines and indicated at position C in FIG. 3.

More specifically, it is contemplated that the armrests will typically be disposed in the rearward position designated C in FIG. 3 when the occupant is sitting in the chair and is carrying out routine functions since rearward position C results in the armrests being disposed more closely adjacent the back of the chair, and hence the armrests are better positioned for supporting the occupant's arms in the region of the elbow and just forward thereof. However, the arm assembly of this invention is particularly desirable for use when the operator is performing intense keyboarding functions i.e., is sitting in front of and operating a computer keyboard. In such use, it is envisioned that the armrests will then be disposed in the inwardly inclined positions designated at A in FIG. 3. In position A, the armrests project forwardly but are angled transversely inwardly, such as at an angle of about 60° relative to the forward direction. This thus results in the armrests angling inwardly directly in front of the occupant, whereby the armrests are disposed so that the occupant can readily support his/her forearms on the armrests to provide support therefor while operating a keyboard. When the occupant wishes to exit the chair, however, the armrests can readily be moved into forward position D so as to not interfere with access to or from the chair. In situations where the operator is operating a computer using a mouse, the mouse is typically mounted on a separate support located to one side of the keyboard. In such situation the appropriate armrest can then be swung outwardly into position B, in which position the armrest still projects forwardly but is angled outwardly at an angle of approximately 40°. This thus enables the user to again support his/her forearm on the armrest while at the same time manipulating the mouse which is positioned on a separate support adjacent one side of the keyboard.

The lower portion of the column member 41 is disposed for supportive engagement within an elongate support tube 61 associated with the arm attachment bracket 24. This support tube 61 is disposed exterior of but adjacent one side of the seat 14 and projects generally vertically relative to the seat in a slightly forwardly inclined relationship, with the support tube 61 being of sufficient axial length as to not only project upwardly above the seat but also downwardly a sufficient extent so that the lower end thereof projects to or slightly below the bottom of the seat. This support tube 61 has a generally cylindrical opening 62 therethrough and its longitudinal axis aligns with the axis 43 of the column member. An elongate sleeve or liner 63 is disposed within and extends lengthwise throughout the majority of the opening 62 and is concentrically fixed within the support tube 61. This sleeve 63 is preferably constructed of a hard plastics material and, in the illustrated embodiment, is preferably initially formed from two half sleeve parts to facilitate installation within the support tube. The sleeve 63 defines therein an interior cylindrical opening 64 in which the lower portion of the column member 41 is axially movably disposed. A stop 65 (FIG. 12) is fixed to the support column 61 and projects inwardly for slidable engagement within an axially elongate groove formed in the exterior surface of the column member 41. This stop 65 is positioned for engaging the lower end of the groove 66 to limit the upward extension of the column 41.

The support tube 61 is part of the arm attachment bracket 24 and, as illustrated by FIGS. 2–5, this bracket also includes a bracket part 67 which has an elbow-shaped configuration in that one end thereof is fixedly attached to the support tube 61, with this bracket part 67 then projecting outwardly in a rearward direction of the chair and then being curved downwardly through an angle of about 90° so as to project downwardly past the side edge of the chair seat 14. This bracket part 67 at its lower end is then horizontally bent inwardly through an angle of about 90°, as depicted by the bend part 68, and the latter in turn joins to an inwardly projecting enlarged mounting plate part 69. This mounting plate part 69 is at least approximately horizontally oriented, and it projects under the chair seat and overlappingly engages an opposed fixed structure associated with the seat frame, and is suitably fixed thereto by fasteners such as screws or bolts, such being accommodated through the plurality of openings provided in the mounting plate part 69. This latter mode of attachment between the chair arm bracket and the seat frame is generally conventional.

The arm attachment bracket 24 of the invention is preferably molded in one piece from a strong and hard plastics material so as to both facilitate construction thereof and at the same time permit the chair arm bracket to have the desired contours.

Considering now the support of the column member 41 within the support tube 61, and referring specifically to FIGS. 6 and 12–14, a resilient anti-friction linear bearing arrangement 71 is provided for supportive and relative linear displacement between the column member 41 and the support liner 63. For this purpose the column member 41 has a plurality of grooves 72 (three grooves in the illustrated and preferred embodiment) formed inwardly from the exterior cylindrical surface thereof, which grooves 72 extend axially of the column member 41 through a selected axial length, and are angularly spaced about the column member, which angular spacing at least approaches uniformity in that at least one groove is uniformly angularly spaced between the other two grooves by intermediate angles which significantly exceed 90°. The liner 63 also has three shallow grooves or tracks 73 formed therein and extending axially therealong, these grooves opening radially outwardly from the inner diameter thereof, and being angularly disposed so that each of the grooves 73 is generally opposed to and radially aligned with one of the grooves 72.

Each cooperating pair of grooves 72 and 73 mount therein a linear ball bearing assembly 74, which assembly includes at least two hardened rolling bearing elements such as balls or spheres 75 associated with an elongate retainer 76 which maintains the balls 75 in the desired spaced relationship axially along the column member. The balls 75 are rollingly engaged with the respective groove or track 73 formed in the liner 63, and are also rollingly engaged with an elongate track member 77 which is disposed within and extends longitudinally of the respective groove 72 formed in the column member 41.

The elongate track member 77 is formed as an elongate thin plate member, preferably being formed from thin spring steel, with the track member initially being performed so as to have a shallow bowed or V-shaped cross section so that, when disposed within the respective groove 72, the track member 77 is supported solely due to the longitudinally extending edges 78 thereof being engaged with the wall of the groove 72. This thus results in the longitudinally extending center portion of the track member 77 being effectively suspended, that is, spaced outwardly from the groove wall. Further, the normal radial spacing between the track member 77 and the opposed track 73 is selected so as to be slightly less than the diameter of the balls 75, such being depicted by the dotted-line position of the track member 77 in FIG. 14. Hence, the presence of the balls 75 causes the cross-sectional center portion of the track member 77 to resiliently deflect radially inwardly into a position diagrammatically depicted by solid lines in FIG. 14, thereby causing the track member 77 to assume an increased bowed or V-shaped configuration. The track member 77 effectively functions as a plate spring in that it continuously imposes a small resilient force radially outwardly against the balls 75, which in turn maintains the balls 75 in continuous rolling or contacting engagement with the outer tracks 73. The resiliency and biasing force imposed on the balls is selected so that play or clearance in all of the bearing assemblies is eliminated at all times so that the column 41 will always maintain a snug fit within the support tube 61, but at the same time the linear ball bearing assemblies provide a minimal or controlled amount of frictional drag to enable the column 41 to be easily linearly displaced in a controlled manner either upwardly or downwardly during a manual height-adjusting operation.

To maintain the armrest 22 in the selected height position but at the same time permit the height to be easily varied, the arm assembly 21 incorporates therein a releasable latching assembly 81 (FIG. 6) which includes cooperating parts which extend from the tip of the armrest 22 downwardly through the support column 23 for cooperation with the attachment bracket 24.

More specifically, the latching assembly 81 includes a latch 82 which is disposed within and carried on the column member 41 adjacent the lower end thereof, which latch is supported on the column member by a pivot pin 83 which extends generally horizontally in perpendicular relationship to the axis 43. The latch 82 is positioned generally adjacent and partially within a rectangular window or cutout 83A formed in the rear end of the column 41, and the latch has a lug or finger 84 which projects rearwardly from the lower end thereof and is adapted for engagement within one of a vertically-spaced series of latching slots 85 formed in the adjacent side wall of the liner 63. A spring 86 cooperates between the opposed side of the column 41 and the lower end of the latch 82 so as to normally pivotally urge the latch into a latching position substantially as indicated by FIG. 6.

The latch 82 is activated into a released position by a roller 88 which rolls along an opposed inner side of the column 41 and also rolls along a cam surface 87 formed on the inner side of the latch 82 so that axial downward movement of the roller 88 and its engagement with the surface 87 causes the latch 82 to pivot in opposition to the spring 86 (clockwise in FIG. 6 about the pivot pin 83) so as to effect release of the latch lug 84 from the latch slot 85.

The roller 88 is mounted on the lower end of a yoke 89, the latter being secured to an elongate push rod 91 which projects upwardly through the column member 41 and terminates in a pinlike actuator part 92, the latter projecting upwardly through the cylindrical hub 44. The push rod 91 is normally maintained in a raised position due to spring 86 maintaining latch 82 in its latched position, whereby the cam surface 87 on latch 82 reacts against the roller 88 and hence maintains the push rod in its raised position.

The upper end of the actuator pin 92 is coupled to the rearward end of an elongate actuating lever 93 which is pivotally supported on and projects longitudinally of the armrest 22. This actuating lever 93 is, intermediate the length of the armrest, pivotally supported by pivot or hinge pin 94 which is engaged within suitable hinge openings formed in the ribs 34, whereby the actuating lever 93 extends longitudinally along the channel 35 defined between these ribs. The hinge part 94 defines a generally horizontal hinge axis which projects transversely of the lengthwise extent of the armrest. A spring 95 cooperates between the actuating lever 93 and the arm cap base 32 so as to normally urge the actuating lever 93 in a clockwise direction about the hinge 94, thereby maintaining the rear end of lever 93 in contact with the upper end of actuator pin 92.

The actuating lever 93 at its forward free end is provided with an enlarged button part 96 which is positioned on the underside of the armrest 22 directly at the front free end thereof. This button part 96 has an exterior downwardly-facing bottom surface which is enlarged and has a smoothly rounded contour so that the chair occupant, when seated, can position a hand in engagement with the free end of the armrest, and then wrap the fingers around the armrest free end for engagement with the button part 96. By exerting an upward pressure on the button part by the fingers, such as by squeezing the free end of armrest between the fingers and the palm, the button part 96 is moved upwardly against the urging of the spring 95, causing a corresponding clockwise pivoting of actuating lever 93 about the hinge 94. This effects a downward pushing of the push rod 91 within the column 41, whereupon roller 88 rolls downwardly along the cam surface 87 which, due to the wedging relationship created relative to the opposed inner wall of the column member, causes the pawl 82 to pivot clockwise about the pivot 83 and effect withdrawal of the latch projection 84 from the latch slot 85. With the latch so released, and the occupant still gripping the front end of the armrest and depressing the latch button 96, the occupant can then easily raise or lower the armrest 22 using minimal force or effort until reaching the desired elevation or height, at which time the finger pressure on the button part 96 is relieved so that the springs restore the latch mechanism back to its original positions. In the event that the latch projection 84 is not perfectly aligned with one of the latching slots 85, then the operator merely has to slightly raises or lowers the armrest, and this causes the latch projection 84 to align with and be automatically spring engaged into one of the latching slots 85.

The chair arm assembly is additionally preferably provided with an annular cap 96 which is secured to the upper end of the support tube 61 in surrounding relation with the column 41 so as to eliminate sharp or abrupt edges, and improve the overall appearance of the assembly.

The operation of the chair arm assembly has already been described in conjunction with the structural description set forth above, so that further detailed description of the operation is believed unnecessary.

Figure 15:
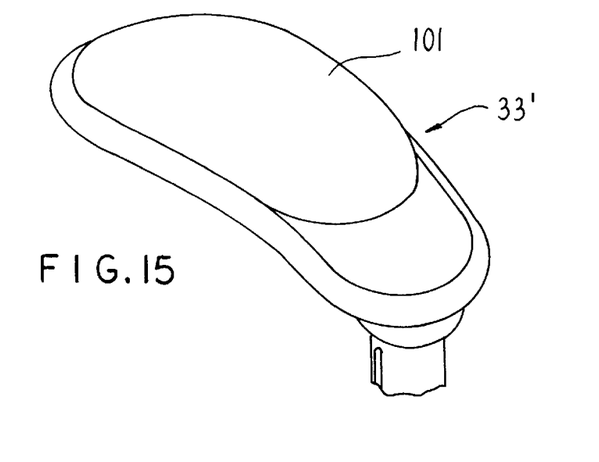
FIG. 15 is a fragmentary perspective view of a modified arm cap according to the invention.
Figure 16:
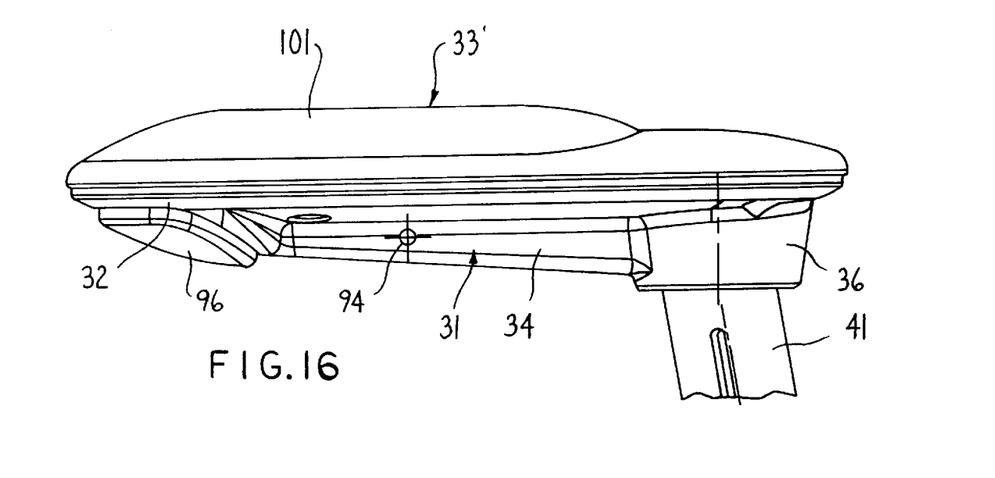
FIG. 16 is a side elevational view of the arm cap of FIG. 15.
Figure 17:
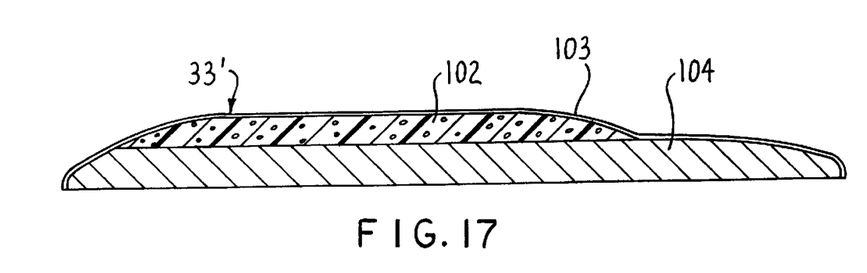
FIG. 17 is a cross sectional view taken generally along line 17—17 in FIG. 16.

Referring now to FIGS. 15–17, there is illustrated a modified arm cap 33' for use on the armrest of this invention. This modified arm cap 33' is provided with the front region 101 thereof being of a raised and increased thickness, the latter being defined by a molded gel 102 captivated by an exterior flexible covering 103. This covering and gel are both disposed over the underlying arm cap member 104, the latter typically being of molded urethane or similar plastic. The presence of this gel layer 102, which layer effectively overlaps the entire arm cap over about the front two-thirds of the length thereof, permits for more uniform distribution of pressure when the occupant's arm or elbow is in contact therewith, effectively preventing or minimizing any bottoming out of the resiliency, and thereby providing a more comfortable and ergonomically desirable contact relationship with the occupant's arm and elbow, particularly for use in environments where the occupant is seated in the chair and is performing intensive work functions such as keyboarding. The gel is a conventional and known product, typically a silicon-base gel.

Although a particular preferred embodiment of the invention has been disclosed in detail for illustrative purposed, it will be recognized that variations or modifications of the disclosed apparatus, including the rearrangement of parts, lie within the scope of the present invention.

The embodiments of the invention in which an exclusive property or privilege is claimed are defined as follows:

1. In a chair having a seat assembly, a back projecting upwardly from and adjacent a rear edge of the seat assembly, and a pair of adjustable arm assemblies mounted on and disposed adjacent opposite sides of said seat assembly and projecting upwardly in cantilevered relation therefrom, the improvement wherein said arm assembly comprises:

a supporting structure mounted on said seat assembly and including a support column which projects upwardly and terminates at an upper end which is disposed in upwardly spaced relation from an upper surface of the seat assembly, the upper end of said support column defining thereon an upwardly cantilevered cylindrical support hub which defines a generally vertically extending swivel axis;

a horizontally elongate armrest mounted on said support column and projecting horizontally therefrom, said armrest adjacent one end thereof defining thereon a support part defining therein a generally cylindrical support bore which opens downwardly and accommodates therein the cylindrical support hub on said support column for enabling the armrest to horizontally swivel about said swivel axis;

said support part having a plurality of circumferentially elongated and circumferentially spaced elastic webs which define said bore and are engaged with and are radially outwardly resiliently deflected by said cylindrical support hub to create a tolerance free but relatively rotatable joint between said cylindrical support hub and said support part which permits rotation of said armrest relative to said support column.

2. A chair according to claim 1, wherein said support part is a one-piece molded plastic member having a generally round tubular cross section, the tubular cross section having a wall thickness between inner and outer peripheries and is provided with a plurality of circumferentially spaced and circumferentially elongate slots formed therein, said slots being spaced a small distance radially outwardly from the inner periphery so as to define said resilient webs therebetween.

3. A chair according to claim 1, including a resilient detent arrangement cooperating between said support hub and said support part for permitting horizontal swivelling of the armrest about the swivel axis and retention thereof in a plurality of angularly spaced positions, said detent arrangement defining a plurality of positions including a first position wherein the armrest projects forwardly from the swivel axis but is angled transversely inwardly at a significant angle so that the armrest projects over the seat, and a second position wherein the armrest projects away from the swivel axis generally along a front-to-rear direction of the chair.

4. A chair according to claim 3, wherein the detent arrangement includes a spring-urged detent member mounted on said support part and cooperating with a detent washer which is secured to and surrounds the support hub and defines a plurality of detent recesses therein which are positioned for cooperation with the spring-urged detent member.

5. A chair according to claim 1, wherein the arm cap includes a gel pad which extends over a significant extent of the upper surface thereof.

6. A chair according to claim 1, wherein said support part includes a plurality of circumferentially spaced and circumferentially elongate slots formed therein, said slots being spaced radially outwardly from an inner periphery of said support part to define said webs therebetween, said chair further including an insert part having projections which insert into said slots to prevent further deflection of said webs.

7. A chair according to claim 6, wherein said insert part comprises a washer having said projections projecting downwardly therefrom.

8. A chair according to claim 7, wherein said projections prevent rotation of said washer relative to said support part, said washer including a resilient detent arrangement which permits horizontal swivelling of the armrest about the swivel axis and retains the armrest in a plurality of angularly spaced positions, one of the armrest and the washer including a detent member and the other of said armrest and said washer including a plurality of recesses, said detent member being resiliently movable and cooperating with the recesses.

9. A chair according to 1, wherein said bore is smaller than said support hub but slidably receives said support hub therein by resilient deflection of said webs.

10. An arm assembly for a chair comprising:

a support structure for mounting on a chair which projects upwardly and terminates at an upper end, the upper end of said support structure defining thereon a cylindrical support hub;

a horizontally elongate armrest mounted on said support hub and projecting horizontally therefrom, one end of said armrest defining a support part wherein said support part defines a generally cylindrical support bore which opens downwardly and accommodates therein the cylindrical support hub of said support structure;

said support part having a plurality of circumferentially spaced and circumferentially elongate slots formed therein, said slots being spaced radially outwardly from an inner periphery of said support part to define a plurality of circumferentially elongated and circumferentially spaced resilient webs which define said bore, said webs being engaged with and being radially outwardly resiliently deflected by said cylindrical support hub to create a tolerance free joint between said cylindrical support hub and said support part; and an insert part having projections which insert into said slots to permit the deflection of the webs for insertion of said support hub into said bore while preventing further radial deflection of said webs.

11. An arm assembly according to claim 10, wherein said slots have a radial width defined by radially inner and outer slot surfaces, said projections fully occupying said radial width when said support hub is inserted into said bore.

12. An arm assembly according to claim 11, wherein said support hub defines a generally vertically extending swivel axis, said tolerance free joint being defined between said cylindrical support hub and said support part and permitting relative rotation therebetween such that said armrest swivels horizontally about said swivel axis.

13. An arm assembly according to claim 12, wherein a detent arrangement is defined between said insert part and said support part such that said armrest is retained in one of a plurality of angularly spaced positions during horizontal rotation thereof.

14. An arm assembly according to claim 10, wherein said bore initially has a diameter which is smaller than an exterior diameter of said support part, said diameter of said bore being increased once said resilient webs are deflected.

15. An arm assembly according to claim 10, wherein said support part has a wall thickness which is defined between inner and outer peripheries thereof, said slots being spaced radially from said inner and outer peripheries.

16. An arm assembly for at chair comprising:

a supporting structure for mounting to the chair which includes a support column that projects upwardly and terminates at an upper end;

a horizontally elongate armrest which is mounted on said upper end of said support column by a swivel connection wherein said armrest projects horizontally and is able to swivel horizontally about a vertically extending swivel axis;

said swivel connection comprising a cylindrical support hub which defines said swivel axis and a support part which defines a cylindrical bore into which said support hub is rotatably received, said support hub and said support part being rotatable relative to each other during swiveling of said armrest relative to said supporting structure, said bore being smaller than said support hub prior to insertion of said support hub therein, and one of said support hub and said support part having a plurality of circumferentially elongated and circumferentially spaced resilient webs which define a peripheral surface thereof and are radially resiliently deflected by insertion of said support hub into said bore to create a tolerance free but relatively rotatable joint between said support hub and said support part.

17. An arm assembly according to claim 16, wherein said webs are defined by a plurality of circumferentially spaced and circumferentially elongate slots which are spaced radially from said peripheral surface.

18. An arm assembly according to claim 17, wherein said pivot connection further includes an insert member having a plurality of projections which project into said slots and prevent further radial deflection of said webs once said support hub is inserted in said bore.

19. An arm assembly according to claim 16, wherein said support part includes said webs therein wherein said peripheral surface defines a periphery of said bore.

20. An arm assembly according to claim 19, wherein said support part is disposed at said upper end of said support column.

* * * * *

UNITED STATES PATENT AND TRADEMARK OFFICE
CERTIFICATE OF CORRECTION

PATENT NO.     : 6,106,070                               Page 1 of 1
DATED          : August 22, 2000
INVENTOR(S)    : Robert T. Ritt et al.

It is certified that error appears in the above-identified patent and that said Letters Patent is hereby corrected as shown below:

Title Page,

Item [75]; delete "Richard N. Roslund, Jr., Georgetown Township, Ottawa County".

Signed and Sealed this

Seventh Day of August, 2001

*Attest:*

NICHOLAS P. GODICI
*Attesting Officer*     *Acting Director of the United States Patent and Trademark Office*